United States Patent
Edmunds

[15] 3,659,687
[45] May 2, 1972

[54] FLUID DRIVE TRANSMISSION WITH RETARDER AND CONTROLS

[72] Inventor: John O. Edmunds, Indianapolis, Ind.
[73] Assignee: General Motors Corporation, Detroit, Mich.
[22] Filed: Sept. 21, 1970
[21] Appl. No.: 73,782

[52] U.S. Cl.................................................192/4 B, 192/3.34
[51] Int. Cl..........................................F16d 67/00, F16d 33/00
[58] Field of Search................192/4 B, 3.23, 3.24, 3.34; 74/731, 752 C

[56] References Cited

UNITED STATES PATENTS

| | | | |
|---|---|---|---|
| 2,946,416 | 7/1960 | Snoy | 192/4 B |
| 2,978,928 | 4/1961 | Tuck et al. | 74/645 |
| 2,990,919 | 7/1961 | Christenson et al. | 192/4 B X |
| 3,053,116 | 9/1962 | Christenson et al. | 74/752 |
| 3,138,969 | 6/1964 | Fisher et al. | 74/677 |
| 3,138,971 | 6/1964 | Fisher et al. | 74/752 |
| 3,241,399 | 3/1966 | Fisher et al. | 74/731 |
| 3,524,523 | 5/1968 | Klimex et al. | 192/4 B |

Primary Examiner—Allen D. Herrmann
Attorney—W. E. Finken and A. M. Heiter

[57] ABSTRACT

A transmission having a torque converter and a hydrodynamic retarder and a three gear dual pump feed system. One pump supplies fluid through a filter to the main line and the main line regulator valve which regulates main line pressure at a high value and supplies the excess fluid to the lubrication line. The lubrication regulator valve regulates lubrication line pressure at a lower value and supplies the excess fluid to the converter line, supplementing the fluid supply from the other pump to the converter inlet. The converter inlet pressure is regulated at a further lower value by a converter bypass valve and the excess fluid supplied to a bypass line. The converter outlet line and the retarder outlet line regulated at a still lower pressure is connected through the cooler to the bypass line which is connected by a retarder valve in the retarder on position to the retarder inlet. A converter regulator valve limits the pressure in the bypass line to a low value so that the retarder is supplied by all available fluid, both the full flow of the converter and retarder outlet and any excess flow from the main line and lubrication system.

3 Claims, 1 Drawing Figure

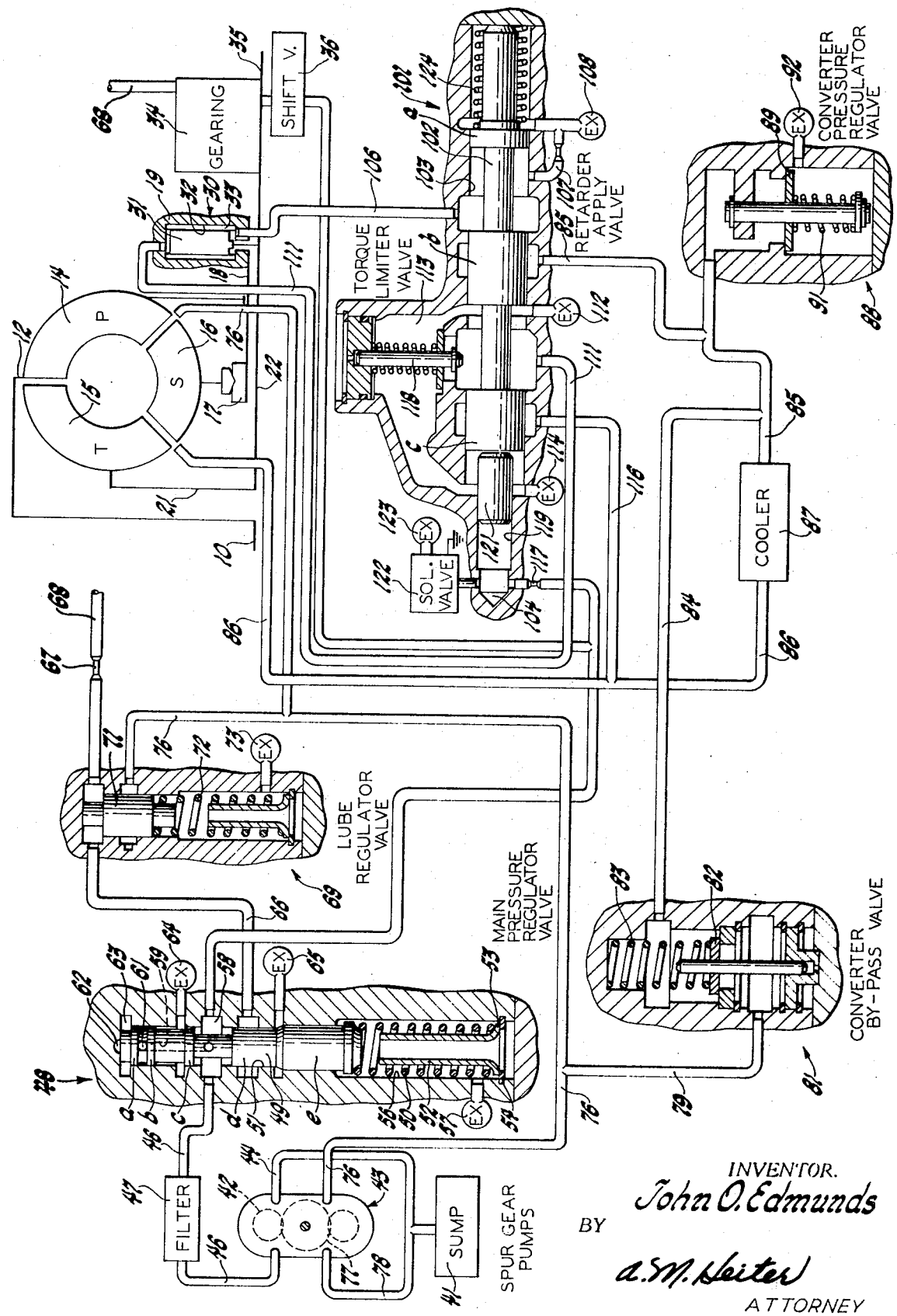

FLUID DRIVE TRANSMISSION WITH RETARDER AND CONTROLS

This invention relates to transmissions and particularly a fluid supply system for a torque converter and retarder.

In transmissions having a fluid drive, such as a torque converter, a hydrodynamic retarder, gearing and a fluid pressure control and supply system for operating a transmission, the fluid flow requirements of the transmission system during normal drive operation when the torque converter and gearing are operating are small compared to the fluid flow requirements when the hydrodynamic retarder is operating. Since the pumps providing the fluid pressure supply for a transmission operating system require power, it is desirable that the transmission control and supply system operate on a minimum amount of fluid. Thus, a first pump provides the regulated main line pressure for transmission control operation, and the excess provides the regulated lower lubrication pressure and the excess of lubrication flow is directed to supplement a second pump supply to the converter. The converter inlet pressure is limited by a bypass valve at a value lower than lubrication pressure. The flow from the torque converter is directed through a cooler to the retarder inlet. Also, the excess fluid from the torque converter supply is bypassed by the bypass valve around the torque converter and cooler to the cooler outlet which is maintained at a low pressure by the converter regulator valve. This dual supply to the cooler outlet is connected by the retarder valve to the retarder inlet. The retarder outlet is connected through the cooler and retarder valve to the retarder inlet. All the fluid supplied by the first pumps is available for transmission control and the excess for lubrication. The excess fluid from the first pump and all the fluid from the second pump is available for the converter supply and the retarder jointly without venting any of this fluid flow to exhaust.

An object of this invention is to provide in a transmission having a fluid drive and a retarder, a fluid supply system wherein both the fluid exhaust from the fluid drive and the excess fluid of the fluid supply to the fluid drive are supplied to the retarder when needed.

Another object of the invention is to provide in a transmission having a torque converter and a retarder, a fluid supply system provided by a dual pump in which one pump provides a main line pressure which is regulated and the excess connected to the regulated lubrication line and the excess fluid from the lubrication line is connected to supplement the other pump supply to the converter inlet with the excess fluid connected by a relief or converter bypass valve to supplement the converter outlet flow through a cooler to the brake inlet and the brake outlet flow through the cooler to the brake inlet.

These and other objects of the invention will be apparent from the following description and drawing of the invention.

The drawing schematically shows the transmission and control of the transmission.

Referring to the drawing, the power train has an input shaft 10 driving a rotary torque converter housing 12 which drives the pump 14. The pump hydrokinetically drives the turbine 15 and the fluid is redirected by the stator 16 to the pump 14. The stator is mounted on a one way brake 17 secured to a sleeve 18 fixed to the housing 19. The turbine is connected by a hub 21 to the torque converter output shaft 22. A hydrodynamic retarder or brake 30 is provided by a plurality of vanes 31 mounted for rotation with shaft 22 and located in a chamber 32 having fixed vanes 33 formed in the transmission housing 19.

A suitable gear unit 34 having two or more fluid operated ratio engaging devices normally connects shaft 22 to output shaft 35. The shift valve 36 selectively connects main line 46 to these devices to selectively engage the drive ratios.

Fluid Supply

The fluid exhausted from the control and lubrication system collects in the sump 41 in the lower portion of the transmission housing. One pump 42 of a three elements per gear pump 43 draws fluid through the suction line 44 and delivers fluid to the main line 46 which passes through the filter 47 and is regulated by the main pressure regulator valve 48. The main pressure regulator valve 48 has a valve element 49 having lands $a$, $b$, $c$, $d$ of equal diameter and a larger land $e$ located in a stepped bore 50. The valve element 49 is biased to the closed position shown by a spring 51 mounted on a combined spring seat and stop element 52 which is a tubular member to limit valve movement and spring compression which has a flared end 53 providing a seat for the spring and abutting snap ring 54 to retain the seat element and spring in spring chamber 56 vented by exhaust 57. The main line 46 is connected between the lands $c$ and $d$ and through port 58 and the bore 59 through the valve to the port 61 between the lands $a$ and $b$ and the port 62 at the end of the valve element to provide hydraulic bias in chamber 63 opposing the spring to regulate the main line pressure at a predetermined value. Regulated pressure is supplied by port 62 to the space between the lands $a$ and $b$ to prevent leakage from chamber 63 to the space between lands $b$ and $c$ vented by exhaust 64 to provide a positive seal between the main line pressure at port 58 and chamber 63 for improved regulation. The forward knockdown pressure may be connected at the step between lands $d$ and $e$ to reduce the regulated pressure to, i.e. 180 psi, in all forward drive positions while pressure in reverse drive is higher, i.e. 300 psi, but since the gearing controls are not shown, this step is vented by exhaust 65. Excess main line pressure in line 46 and chamber 63 moves the regulator valve element 49 to the exhaust position exhausting line 46 to overage line 66 which feeds through restriction 67 to the lubrication line 68 which lubricates the gearing. Overage line 66 is also connected to the lubrication relief regulator valve 69 which has a valve element 71 biased to a closed position by a spring 72 in a chamber vented by exhaust 73 and is closed when the overage pressure does not exceed a low value to first supply lubrication line 68. When the lubrication pressure is sufficient, overage pressure exceeds this intermediate value, i.e. 80 psi, and the valve 69 opens to connect overage line 66 to the converter feed line 76 to supply fluid to the torque converter. The other pump 77 of the pump unit 43 draws fluid via suction line 78 and delivers fluid to the converter feed line 76 to provide the main feed to the torque converter. When this torque converter feed pressure exceeds a predetermined low pressure, i.e. 62.5 psi, excess fluid flows via branch 79 of converter feed line 76 moving valve element 82 against the bias spring 83 of converter bypass valve 81 to exhaust converter feed pressure via branch 84 to the cooler outlet line 85. The converter outlet line 86 is connected through the cooler 87 to the cooler outlet line 85 where the pressure is limited by the converter pressure regulator valve 88 which has a valve element 89 normally biased by spring 91 to block passage to exhaust 92 but which, at a predetermined low pressure, i.e. 25 psi, opens to exhaust 92 to limit the pressure in cooler outlet line 85.

Retarder Valve

The retarder or brake valve 101 controls the operation of the hydrodynamic brake 30. There is a valve element 102 having lands $a$, $b$ and $c$ of equal diameter located in a bore 103 and is biased to the brake-off position shown by pressure located in a chamber 104. In brake-off position, brake in-line 106 is connected between the lands $a$ and $b$ to the restricted exhaust line 107 connected to exhaust 108. The cooler out-line 85 is blocked by land $b$, the retarder out-line 111 is connected between lands $b$ and $c$ to exhaust 112 and via exhaust passage 113 to exhaust 114. Converter out-line 116 is blocked by land $c$. The main line 46 is connected by a restriction 117 to the chamber 104 at the end of bore 119 having a plug 121 therein which acts on the valve element 102 when chamber 104 is pressurized. The manually controlled solenoid valve 122 is normally spring closed to pressurize chamber 104 and position the brake valve element 102 in the position shown, the brake-off position. When the solenoid valve 122 is energized to vent chamber 104 to exhaust 123, the spring 124 moves the valve 102 to the left, to the brake-on position, connecting cooler out-line 85 to retarder or brake inlet line 106, and retarder out-line 111 to the converter out or cooler in-line 116. Retarder out-line 111 always connects to a spring loaded pressure relief valve 118 or torque limiter valve which regulates the retarder out pressure at a low value to provide a controlled amount of hydrodynamic braking.

Operation

When the engine driving this transmission is running, the transmission input driven pump 42 supplies fluid under pressure to the main line 46 which is regulated at a normal line pressure value, i.e. 180 psi. The regulator valve exhaust or overage line 66 is connected through restriction 67 to the lubrication line 68 which lubricates the transmission. The overage line is maintained above a lower pressure value, i.e. 80 psi, to properly feed the lubrication system and excess fluid is then bypassed by lubrication regulator valve 69 to the converter feed line 76 which is also supplied with fluid by a second input pump 77. The converter feed pressure in line 76 is regulated at a low pressure, i.e. 62 psi, by the converter bypass valve 81 which bypasses overage to the cooler outlet line 85. The converter outlet flow in line 86 also passes through the cooler 87 to the cooler outlet line 85. The converter regulator valve 88 regulates the cooler outlet line at a low pressure, i.e. 25 psi, to control converter outlet pressure. When the brake valve 101 is in the brake-on position, the cooler outlet line is connected by brake inlet line 106 to supply the hydrodynamic brake 30 at the pressure regulated by the converter regulator valve. In the brake-off position shown, the cooler outlet line 85 is blocked and overage fluid flows via exhaust 92 to sump 41.

The first or main input pump 42 thus supplies the main line 46 regulated by regulator valve 48 at a high pressure, i.e. 180 psi, for a conventional gearing control system or the one shown in Ser. No. 852,760, filed Aug. 25, 1969, and refiled as a Continuation-In-Part, Ser. No. 138,655 filed Apr. 29, 1971, by Robert H. Schaefer and Joseph R. Fox, with the overage connected to the lubrication line 68. Then the lubrication valve regulates lubrication pressure at a next lower intermediate pressure, i.e. 80 psi, and the lubrication overage substantially continuously supplements the second or converter supply input pump 77 which supplies the torque converter inlet. The converter inlet pressure is limited by converter bypass valve 81 at a next lower intermediate pressure, i.e. 62 psi, and the overage is not exhausted but connected to a bypass line where pressure is limited at a lowest value, i.e. 25 psi, to supplement the supply to a second device, the retarder 30, which is broadly referred to as means requiring a second fluid supply also supplied through the converter and cooler. The torque limiter valve 118 limits the retarder out pressure during retarder operation to a pressure intermediate the converter bypass pressure, 62 psi, and the converter regulator pressure, i.e. 25 psi or about 50 psi, so retarder out flow will join converter out flow and pass through the cooler to the retarder valve for the retarder inlet. The converter bypass valve 81 functions in conjunction with the flow through the converter and cooler to deliver all available fluid, oil, to the secondary supply for the retarder. Thus, when the retarder valve 101 has just been placed in the brake-on position, and the chamber 32 is being filled, converter regulator valve 88 will close so that all fluid is available for the retarder. Fluid is not withdrawn from the converter by the normal centrifugal pump action of the illustrated retarder having a central inlet and a peripheral outlet which lowers inlet pressure and increases outlet pressure proportional to rotor speed. During normal operation of the converter and/or retarder, converter regulator valve 88 will open exhausting excess fluid to sump. The converter regulator valve, when the retarder is off, regulates to establish a uniform pressure drop across the converter and cooler for normal flow, when the retarder is on and being filled, closes to deliver all available oil and when the retarder is on and filled, will regulate to maintain brake inlet pressure. If, during retarder operation, high retarder outlet flow reduces converter outlet flow, this fluid is bypassed by the converter bypass valve and is still available, as a secondary supply to the retarder.

It will be appreciated that the invention may be used in the above described preferred embodiment and modifications thereof.

IT IS CLAIMED

1. In a transmission having a fluid drive having a fluid inlet and a fluid outlet and requiring a first fluid supply, means requiring a second fluid supply, pump means providing a source of fluid under pressure, a regulator valve connected to said source for regulating the pressure of said source at a high value and connecting the overage to said fluid inlet of said fluid drive, a cooler having an inlet connected to said fluid outlet of said fluid drive and having an outlet connected to supply said means requiring a second fluid supply, a bypass passage connecting said fluid inlet of said fluid drive to said cooler outlet having an intermediate pressure relief valve connecting said fluid inlet in bypass relationship around said fluid drive and cooler to said cooler outlet, means connecting said cooler outlet to said means requiring a second fluid supply and a low pressure relief valve connected to said cooler outlet limiting the pressure supplied to said means requiring a second fluid supply.

2. In a transmission having a fluid drive having a fluid inlet and a fluid outlet and a hydrodynamic retarder having a fluid inlet and a fluid outlet which pumps fluid from a low inlet pressure to a high outlet pressure, a restricted lubrication line, a first pump providing a source of fluid under pressure, a main regulator valve regulating the pressure of said source at a high pressure and connecting the overage to said lubrication line, a lubrication regulator valve regulating pressure in said lubrication line at a high intermediate pressure and connecting overage to said fluid drive inlet, a second pump connected to supply said fluid drive inlet, a cooler having a cooler inlet connected to said fluid drive outlet and a cooler outlet, a bypass line connected to said cooler outlet, a bypass valve regulating the pressure of said fluid drive inlet at a low intermediate pressure and connecting overage to said bypass line, a low pressure relief valve connected to said cooler outlet and a retarder valve, operative in the retarder on position to connect said cooler outlet to said retarder inlet and said retarder outlet to said cooler inlet and in the retarder off position blocking the connection of said cooler outlet to said retarder inlet and connecting said retarder outlet to exhaust.

3. In a transmission having a fluid drive having a fluid inlet and a fluid outlet, a hydrodynamic retarder having a fluid inlet and a fluid outlet which pumps fluid from a low inlet pressure to a high outlet pressure and gearing having fluid pressure controls, a restricted lubrication line, a first pump providing a source of fluid under pressure, a main regulator valve regulating the pressure of said source at a high pressure connected to said fluid pressure controls and connecting the overage to said lubrication line, a lubrication regulator valve regulating pressure in said lubrication line at a high intermediate pressure and connecting overage to said fluid drive inlet, a second pump connected to supply said fluid drive inlet, a cooler having a cooler inlet connected to said fluid drive outlet and a cooler outlet, a bypass line connected to cooler outlet, a bypass valve regulating the pressure of said fluid drive inlet at a low intermediate pressure and connecting overage to said bypass line, a low pressure relief valve connected to said cooler outlet and a retarder valve, including a torque limiter relief valve relieving pressure at a value intermediate said low intermediate and low pressures, operative in the retarder on position to connect said cooler outlet to said retarder inlet and said retarder outlet to said torque limiter valve and to said cooler inlet and in the retarder off position blocking the connection of said cooler outlet to said retarder inlet and connecting said retarder outlet to exhaust.

* * * * *